March 5, 1935. W. J. LIBBEY ET AL 1,993,175
PROCESS AND APPARATUS FOR FILTERS
Filed July 1, 1932 2 Sheets-Sheet 2
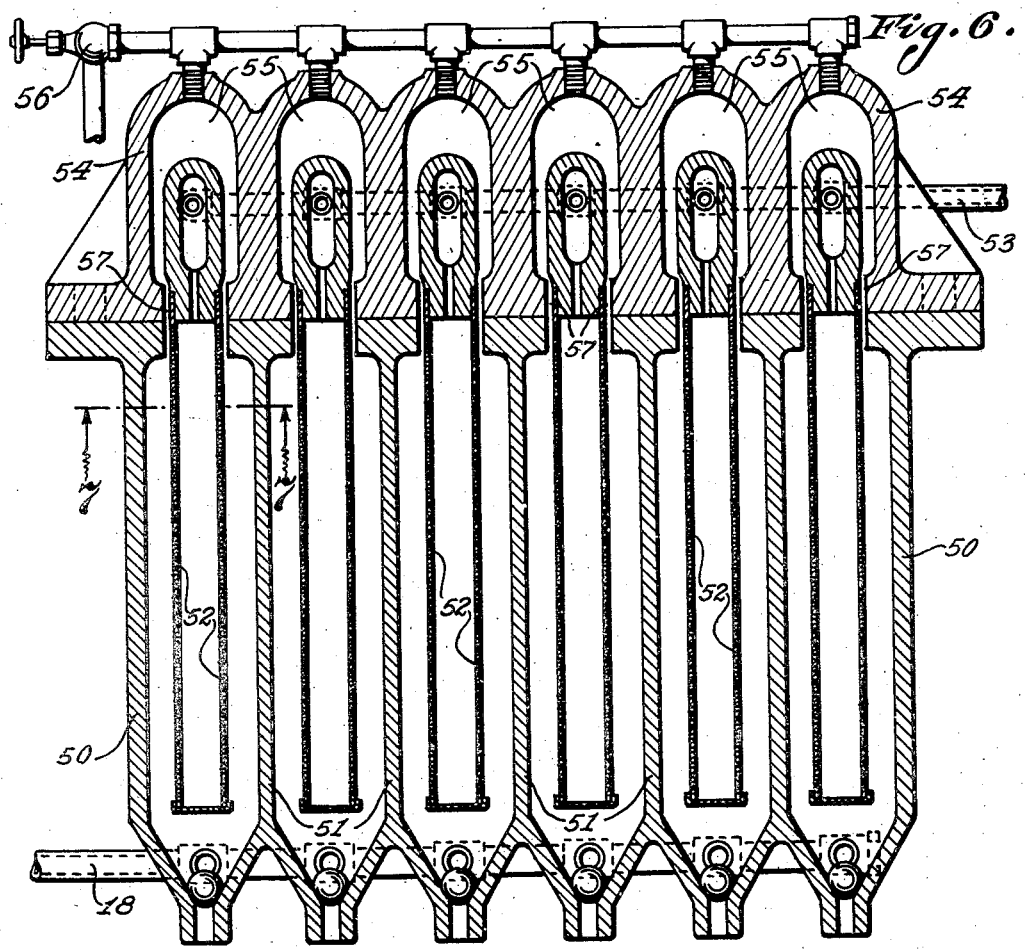
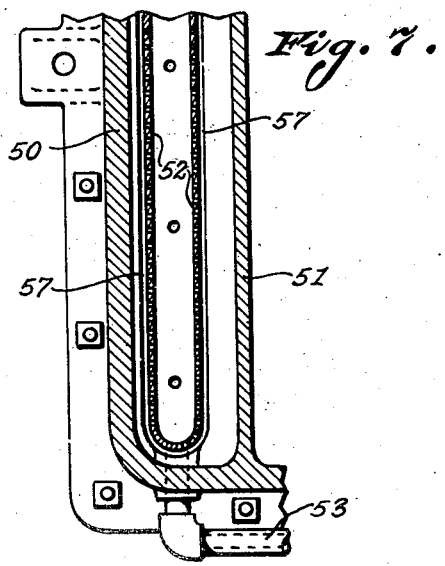
Inventors
WALTER J. LIBBEY, & L'ROCHE G. BOUSQUET, Patented Mar. 5, 1935

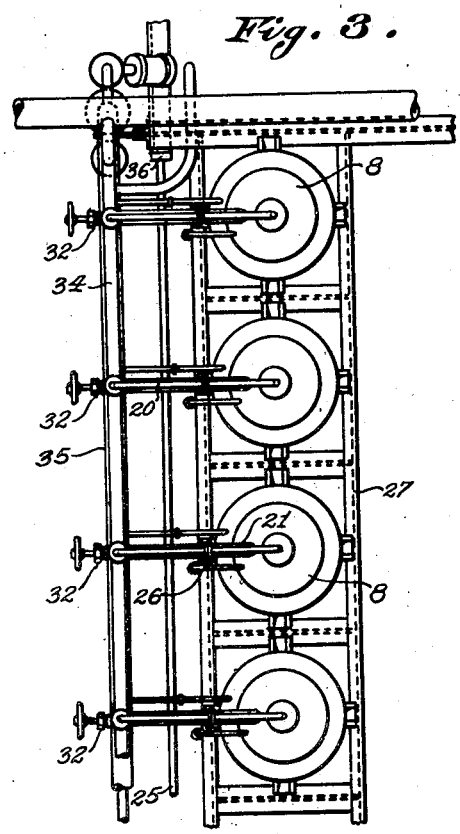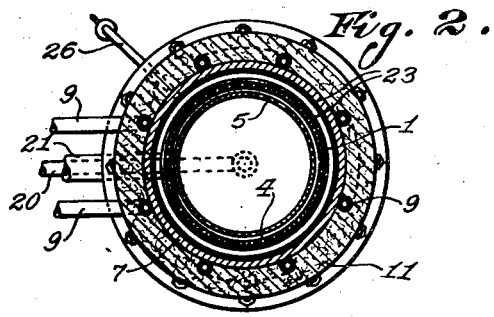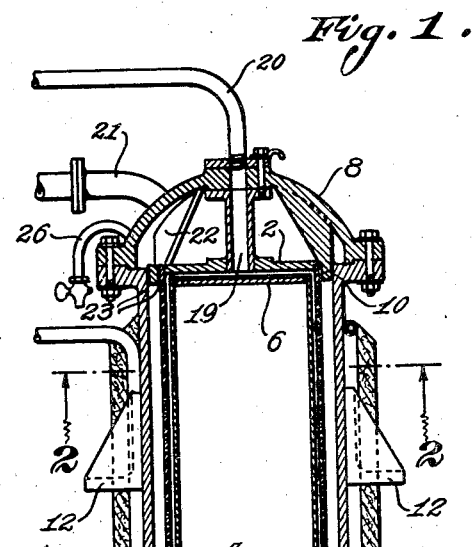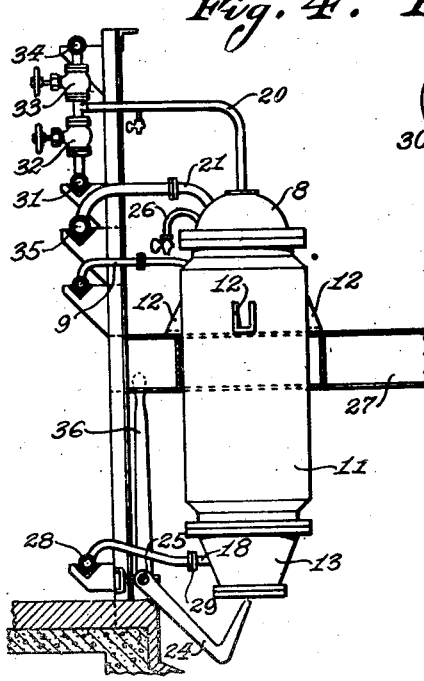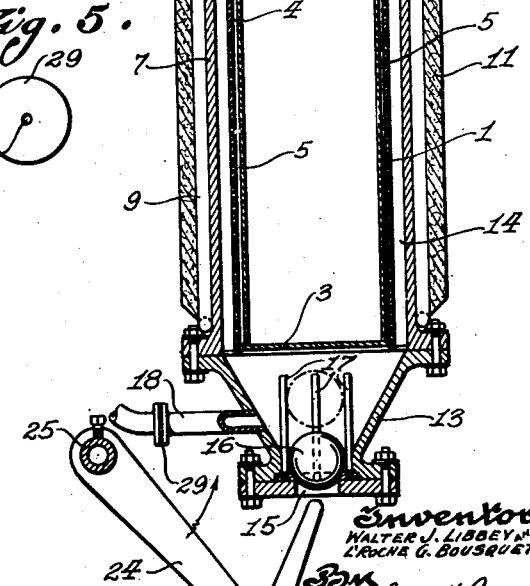

1,993,175

UNITED STATES PATENT OFFICE 1,993,175

PROCESS AND APPARATUS FOR FILTERS

Walter J. Libbey, Kirkwood, and L'Roche George Bousquet, Webster Groves, Mo.

Application July 1, 1932, Serial No. 620,330

4 Claims. (Cl. 210—182)

This invention relates generally to filters and particularly to self-sluicing filters and a method of cleaning filter media whereby this operation may be accomplished while the filter medium is in situ.

Many efforts have heretofore been made to provide a filter so constructed and arranged as to permit the same to be cleansed without dismantling and without removing the filter medium therefrom. The filters usually employed in commercial operation are of such type that it is necessary to render a plurality of individual filter media inoperative when as in cases of emergency one particular medium becomes incapacitated. Likewise in the cleansing operation which is periodically necessary it often happens that one filter medium of a battery becomes disabled or loaded to an extent that it is rendered practically inoperative while the other filter media of the battery are in operative condition. It is among the objects of the present invention, therefore, to provide a filter so constructed and arranged that it lends itself to use in a battery and permits the discontinuance of one individual medium without interfering with the operations of other media of the battery.

A general object of the present invention is to provide a filter in which the filter medium may be cleansed in situ and without dismantling the filter.

Another object of the present invention is to provide a sluicing device for a filter medium so constructed and arranged as to be efficient in operation and readily controlled.

A further object of this invention is to provide a method of cleaning filters which lends itself to use in connection with filter devices and without necessitating disadvantageous removal or dismantling of the device or parts thereof.

A more specific object of this invention is to provide a self-sluicing filter wherein a sluicing liquid may be directed in such manner as to strip solids from a filter medium.

Other objects will become apparent to those skilled in the art when the following description is read in connection with the accompanying drawings in which:

Fig. 1 is a sectional view in side elevation of a self-sluicing filter constructed in accordance with the present invention;

Fig. 2 is a sectional view taken along line 2—2 of Fig. 1;

Fig. 3 is a plan view showing the arrangement of a plurality of filters constructed in accordance with the present invention in battery form.

Fig. 4 is a view in end elevation of the arrangement shown in Fig. 3.

Figure 5 is a detail view of an orifice plate employed in the battery arrangement shown in Figures 3 and 4.

Figure 6 is a longitudinal sectional view of a modified form of filter constructed in accordance with the present invention.

Figure 7 is a sectional view taken along line 7—7 of Fig. 6.

In accordance with the present invention which is equally applicable to filters which are employed for the purpose of clarifying liquors, and filters which are employed for recovery of solids as well as in filtering operations wherein it is desired to save both the clarified liquor and the residual solids, means is provided whereby the filter medium may be cleansed with facility and without necessitating removal thereof from the case or tank in which it is positioned during operation. More specifically in accordance with the present invention means is provided whereby a stream of sluicing liquid, preferably in sheet form and substantially conforming in shape to the contour of the filter medium, is projected against a loaded filter medium in such a manner as to strip or peel therefrom the collected solids. In this connection the present invention contemplates a method whereby the collected solids on a filter medium may be preliminarily loosened before the application of the sluicing stream above referred to. This invention further contemplates an arrangement whereby the contents of a filter device may be suddenly released and discharged in the form of a gush with such rapidity as to facilitate in the cleansing or sluicing operation. In accordance with the present invention the filter is so constructed and arranged as to readily permit the discontinuance of any individual filter device of a battery without interfering with the operation of other devices and is further preferably arranged in such manner that a plurality of filter devices comprising a battery may be simultaneously sluiced or cleansed.

Referring now particularly to Figs. 1 and 2 of the drawings for an illustrative embodiment of the present invention any suitable filter medium, such for instance as a cloth or screen 1, is preferably arranged in the form of a cylinder as clearly shown in Fig. 2. This tubular or cylindrical arrangement of the filter cloth or screen is particularly advantageous due to the fact that this arrangement yields a larger productive filter area with reference to the volume occupied thereby and permits the filter screen or cloth to be so supported that the life thereof is maximum. The filter medium 1 may be suitably supported as by an attachment at one end thereof to a head 2. The lower end of the filter medium 1 is, in accordance with the present invention, sealed off or blocked by a suitable plate, such as 3, which also serves to maintain the shape of the filter medium at the lower end. On the interior of the filter medium 1 is arranged an imperforate tube 4, the peripheral walls of which are preferably but slightly spaced from the inside of the filter medium 1 whereby to provide an annular passage 5 therebetween. The ends of the imperforate tube 4 are suitably closed as by the plate 3 at one end and a plate 6 at the other end. By providing the imperforate tube on the interior of the filter medium 1 it is apparent that the volumetric capacity of the filter device is substantially reduced and a smaller quantity of filtrate required to completely submerge the entire active area of the filter medium 1, which must be accomplished in the illustrated embodiment before any filtrate is removed.

The parts just described may be suitably supported on the interior of a suitable tank or case and are preferably mounted in individual cases although it is apparent that a plurality of such filter media may be arranged in one tank or case. The filter medium 1 is positioned on the interior of a case 7 also tubular in construction and carried thereby through a dome 8 to which the head 2 is suitably connected. As shown in the drawings the case 7 may be provided with a heating device as for instance a steam jacket 9 which may in turn be covered with a suitable lagging 11 and mounted on the exterior of the case 7 may be suitable supporting lugs as 12.

At the bottom of the case 7 may be mounted a conical member 13 which forms a closure for that end of the case 7. The bottom 13 is so mounted that the annular space 14 which exists between the interior of the case 7 and the exterior of the filter medium 1 is in communication therewith. The conical bottom 13 is provided with an orifice 15 preferably of such size and shape as to permit the contents of the filter to be released or dropped therefrom with substantial rapidity in the form of a gush. A suitable quickly operating valve shown in the form of a ball 16 having a cage 17 is provided for controlling the orifice 15. A suitable conduit 18 may be provided for communicating with the conical bottom 13 and adapted to supply thereto the feed liquor or pulp.
Connected to the dome 8 and communicating with the annular space 5 through a tube 19 which forms a part of head 2, is a suitable conduit 20 provided for the purpose of conducting away the filtrate from the annular space 5 and also for the additional purpose, as will be hereinafter described, of supplying a reverse pressure and facilitating the cleansing operation upon the filter medium 1. A conduit 21 is also connected to the dome 8 and through this tube the sluicing liquid may be introduced into the dome. On the interior of the dome 8 there is provided a ring 10 which may be cast integrally with the dome and connected thereto by suitable ribs 22. The ring 10 is preferably so formed as to substantially fill the annular space 14 which exists between the exterior of screen 1 and the interior of case 7 in the region of the head 2. Sufficient clearance, indicated as 23, is, however, left between ring 10 and the adjacent exterior of screen 1 and interior of case 7 to permit the passage of streams of sluicing liquid. The clearance between the interior of ring 10 and exterior of screen 1 acts, therefore, as a nozzle and is so arranged as to project a stream substantially conforming in shape to the external contour of the screen 1. Likewise in the embodiment illustrated, the clearance between ring 10 and the interior of case 7 acts as a nozzle discharging a stream across the interior of case 7, but it may be pointed out that under some conditions successful sluicing can be accomplished without the clearance between ring 10 and case 7. It is apparent that when a supply of sluicing liquid is supplied to dome 8 of the filter of Fig. 1, annular streams will be projected under pressure through spaces 23 in a direction substantially parallel to the surface of the screen 1 and downwardly thereacross, the effect of which will be to peel or strip therefrom the load of collected solids. Furthermore, if desired, the nozzle, such as 23, may be mounted for movement across the filter medium either vertically or horizontally. It is, however, of particular importance that the active direction of the sluicing stream be substantially parallel to the surface of the filter medium.

Suitable means such for instance as a lever 24 mounted upon a shaft 25 may be provided for actuating ball valve 16 to raise the same at will. The filter device of this embodiment may be provided with a suitable air vent 26.

A plurality of the filter devices just described may be arranged in battery form as shown in Figure 3 wherein suitable framework, such as 27, may be provided for supporting the desired number of filter devices such as that shown in Fig. 1. Each of the filter devices which comprises the battery may be supplied with liquor or pulp to be filtered or clarified from a feed supply header, as for instance 28, having a plurality of branches each connecting with conduit 18 of the filter devices. The filter device hereinbefore described is particularly adapted for pressure operation, i. e., under such conditions that pressure is applied to the liquor or pulp to be filtered although it is to be understood that the same may be operated by providing a vacuum at the filtrate line. In order to regulate and maintain the pressure in each of the filter devices which comprises the battery substantially uniform the present invention contemplates the provision of means for regulating the flow at each of the respective filters in such manner as to maintain the same pressure on each filter device of the battery. In the embodiment illustrated an orifice plate 29 is provided between the feed supply header 28 and conduit 18 of each of the filter devices. It will be understood that orifice plate 29 is provided with an orifice 30 so proportioned as to properly control the flow of pulp or liquor to the corresponding filter devices. It will be understood, therefore, that on the filter device nearest the source of supply the orifice 30 will be smaller than those in the filter devices more remote from the source of supply. By thus regulating and maintaining substantially the same pressure on each of the filter devices the accumulation of solid matter on each of the screens or the filter media will be substantially uniform and when the filter medium of one filter device is so loaded as to require cleansing, all will be in substantially the same condition. It will be understood that any other suitable means may be provided for regulating the pressure on the series of devices; and, if desired, means may be provided for varying the pressure during the filtering and pre-coating cycles.

Arranged along the framework 27 and connected to each of the respective filter devices is a series of conduits, as for instance 31, which is connected through valves, such as 32, to the conduits 20 of the respective filter devices. The conduits 20 of each of the filter devices are also connected through valves, such as 33, to conduit

34. In the embodiment illustrated, the conduit 31 may be understood as adapted to receive the filtrate which is discharged by the filter devices through conduits 20, it being understood that the valves 32 are in open position while the filter devices are in operation. The conduit 34 may be understood to supply a suitable pressure in a direction reverse to normal for the purpose of loosening the solids on the filter medium in a manner to be hereinafter described. A suitable conduit 35 is provided for conducting a supply of sluicing liquid to the respective filter devices being connected with conduits 21 of each of the devices. When arranged in battery form as shown in Figure 3, a single shaft 25 may be mounted to extend longitudinally of the battery and may be provided with a plurality of levers 24, one for each filter device. A suitable handle, as for instance 36, may be provided for operating shaft 25 to simultaneously raise ball valves 16 of all or any desired number of filter devices which comprise the battery. Furthermore, if desired, master valves for simultaneously controlling the headers and conduits for all the devices of a battery may be provided.

By arranging the parts in the manner hereinbefore described, a filter is provided wherein the required content of liquor to be filtered may, if desired, be very low. The annular space 14 may be made very small, if desired, and this is of particular advantage in the treatment of slowly-filtering materials, where the time element is of great importance. By making the annular space 14 of comparatively low volume, the content of valuable liquor contained in the device when the medium becomes loaded is a minimum, and accordingly the washing time is minimized, and it is unnecessary to take special precaution in order to save the content of valuable liquor.

In the operation of the filter device hereinbefore described it will be understood that the filter medium may be, preliminarily to operation, provided with the usual precoat. This may be accomplished by the circulation of a liquid, preferably previously clarified liquor to which has been added a desirable amount of filter aid. This mixture may be circulated and recirculated through the filter device until the desired precoat is deposited upon the filter medium. The supply of slurry or pulp to be filtered may then be introduced through feed supply header 28 and the feed conduits 18 of the respective filter devices. It will be understood that sufficient of the mixture to be filtered is introduced into the filter device to completely fill the annular space 14 which exists between the exterior of screen 1 and the interior of the case 7. In accordance with the usual practice pressure may be applied to the substance undergoing filtration. The clarified liquor or filtrate will emerge on the interior of filter medium 1 in the annular space 5 and from there be withdrawn through conduits 19 and 20 and conducted to conduit 31 for storage or other disposal. The arrangement shown in the drawings is particularly advantageous, especially since by virtue of the fact that the active area of the filter medium is completely submerged in the substance undergoing filtration before any filtrate is removed, the tendency is for an even and uniform distribution of solids over the filter medium, which also facilitates the cleansing operations and increases the efficiency of the device.

When the filter device has been in operation for a time sufficient to cause the filter medium to become loaded, the supply of feed liquor or pulp thereto may be discontinued by the operation of a suitable valve. The usual washing operation may then be accomplished in order to remove from the solids collected on the filter medium the liquor entrained therein. This may be accomplished by introducing through the feed supply line a supply of washing water, and this, it will be understood, will be forced through the filter until the valuable liquors are recovered from the load of solids, whereupon the supply of washing water may be discontinued and the cleansing operation begun. At this time valve 32 may be closed in order to block the connection between conduit 20 and the filtrate conduit 31. Valve 33 may then be opened to connect the interior of the filter medium to the annular space 5 with a source of pressure supply, and, if desired, a suitable amount of fluid, such for instance as water, steam or air under pressure, may be introduced through conduit 20 from conduit 34. This pressure, it will be understood, is in the opposite direction to the normal filtering pressure and tends to loosen the solids which are collected on the exterior of the filter medium. It will be understood that this operation in the embodiment shown in Figs. 3 and 4 occurs simultaneously with all the filter devices of the battery, but by provision of suitable valves any one or more of the devices may be individually controlled.

Either concurrently with or prior to the introduction of the pressure fluid through conduit 20 an attendant may throw handle 36 in a counter-clockwise direction, as seen in Fig. 4, thereby actuating the various levers 24 and raising ball valve 16 in each of the filter devices from its seat. As pointed out above, the orifice 15 is of such size as to permit the contents of the filter device to fall or drop out substantially rapidly. This has the tendency of further loosening the collected solids on the exterior of the filter medium. In accordance with the present invention after the ball valve 16 has been raised to permit the contents of the filter to be quickly discharged, a supply of sluicing liquid, for instance water preferably under pressure, is introduced into dome 8 through conduit 21. The accumulated water under pressure in dome 8 is then discharged through the clearance spaces 23 which, it will be understood, extend entirely around the filter medium 1 and thereby form, in effect, annular nozzles being substantially the same shape as the external contour of the filter medium. The streams of sluicing liquid therefore issue from clearances 23 in the form of annular sheets, in the embodiment illustrated in Fig. 1, the direction of which is substantially parallel to the surface of filter medium 1 and the force of which is downward. The action of the sluicing liquid is such as to dislodge the collected solids from the exterior of the filter medium and the action may be characterized as one of stripping or peeling the collected solids therefrom. The downward flow of the sheets of sluicing liquor carries with it the solids which are dislodged from the filter medium 1, and this is emitted through the open quick discharge valve 16. After this sluicing operation has continued for a time sufficient to remove the collected solids from the filter medium, the quick discharge valve 16 may be closed and the sluicing liquor allowed to accumulate in the device and fill up the annular space 14. In this manner, it is readily possible to clean the filter supply line, and this may be accomplished at this time by opening a drain valve, which may be suitably positioned for instance on the supply conduit 28. After the draw-in valve 28 is opened, the water contained in the device which has accumulated since the closing of quick discharge valve 16 will be forced outwardly through the conduit 18 and supply header 28, by virtue of the pressure exerted on the interior of the filter—that is, by the introduction of steam, air, or water under pressure through the conduit 20. As the water contained in tank 7 discharges through the conduit 18, the level thereof will be gradually lowered in the tank and a progressively greater area of filter medium will be exposed above the level of the water. Consequently the fluid, for instance steam under pressure on the interior filter medium 1, is particularly effective to blow out the interstices of the filter medium directly above the surface of the water. Since the level of the surface of the water is being gradually lowered, it is apparent that the entire filter medium will be efficiently cleansed so as to prevent blinding thereof and prolong the life of the filter medium.

With the sluicing operation to remove the load of solids from the filter medium accomplished and the feed supply line cleaned, the device is now in condition for a repetition of the filtering cycle.

Referring now particularly to Figs. 6 and 7 a modified form of the invention is shown wherein the principles hereinbefore referred to are applied to a type known as the plate and frame filter. A suitable tank 50 is provided to receive a plurality of individual filter media and is preferably divided by a plurality of laterally extending partitions 51, each of which defines a separate filtering compartment. The material to be filtered may be introduced into the tank through the supply conduits 18 in the manner hereinbefore described. Mounted in each of the compartments defined by partitions 51 is a filter element 52 in the form of a filter plate. The interior of the respective filter plates 52 is suitably connected to a filtrate conduit, such as 53. Accordingly when the respective compartments become filled with the pulp or liquor to be filtered the pressure applied to the liquor or pulp is sufficient to cause the fluid constituents to pass through the filtering element 52 and be collected in conduit 53 as filtrate or clarified liquor.

In the embodiment illustrated in Figs. 6 and 7 a multiple header 54 is provided and a plurality of domes 55, each connected with a suitable source of sluicing liquid 56, are arranged therein. The header 54 is so arranged that the dome 55 may communicate with the corresponding compartments of tank 50 through narrow openings 57. The openings 57 extend adjacent the filter media of frame 52 and as will be apparent from Fig. 7 the shape of the opening 57 for each of the respective filter elements 52 is substantially the same as the external contour of the filter medium. In this manner when a supply of sluicing liquid is introduced into dome 55 it is apparent that a sheet-like stream thereof will be directed downwardly across substantially the entire area of the filter medium thereby producing the same stripping or peeling action as hereinbefore described and readily removing the collected solids therefrom.

It will be understood that the embodiment illustrated in Figs. 6 and 7 readily lends itself to the process of cleaning which was hereinbefore described in connection with the embodiment of Fig. 1 particularly since by the provision of suitable valves a reverse pressure may be applied through conduit 53 to loosen the collected solids upon the exterior of the filter medium. It is understood, of course, that the quick discharge valves, one of which may be provided for each individual compartment as shown or, if desired, a single quick discharge valve for all compartments, may be operated for suddenly releasing or dropping the contents from all the various compartments in the form of a gush as hereinbefore described with reference to the embodiment of Fig. 1; in the latter case, however, the partitions 51 may be eliminated.

From the foregoing description it is apparent that many modifications of the filter hereinbefore described will present themselves to those skilled in the art without departing from the spirit of this invention. It is to be distinctly understood, therefore, that this invention is not limited to the specific details hereinbefore set forth for the purposes of illustration, but that such modifications and use of such individual features and sub-combinations of features, as do not depart from the spirit of this invention are, although not specifically described herein, contemplated by and within the scope of the appended claims.

Having thus described the invention what is claimed is:

1. A self-sluicing filter comprising, in combination, a cylindrical casing, a cylindrical filter medium within and coaxial of the casing, feeding means below the medium and communicating with the exterior thereof, filtrate discharge means above and communicating with the interior of said medium and a member including a sluicing port extending substantially around and inside a head of the casing, and along one margin of the filter medium.

2. In the art of filtering, the method of cleaning hollow filter media comprising, submerging the medium, applying fluid pressure internally of the medium and concurrently removing the submerging liquor from the region of the medium, and projecting a sheet of cleansing fluid, along the surface of the filter medium.

3. In a filter cell, a tubular casing, a tubiform filter medium, disposed within and spaced from the inner wall of the casing, to constitute a substantially annular chamber, means for introducing a solid-bearing fluid to said chamber, and a sluicing head disposed at one end of said chamber and provided with a pair of spaced slots, said slots being substantially coextensive, respectively with margins of the casing wall and of the filter medium, and means for supplying fluid to the sluicing head for projection through said slots.

4. In a structure constituting a filter cell, a tubular housing or casing, a tubular filter element or medium arranged coaxially within the casing and spaced from the casing wall to constitute a substantially annular compartment, a removable head closure at one end of the casing and a substantially annular element mounted at one end of said compartment and within the casing, said annular element being formed and positioned in the casing to provide an orifice for the projection of a fluid into said compartment, the annular member being arranged for removal from the casing with said head, to facilitate the removal from the casing, of said filtering element.

WALTER J. LIBBEY.
L'ROCHE GEORGE BOUSQUET.

34. In the embodiment illustrated, the conduit 31 may be understood as adapted to receive the filtrate which is discharged by the filter devices through conduits 20, it being understood that the valves 32 are in open position while the filter devices are in operation. The conduit 34 may be understood to supply a suitable pressure in a direction reverse to normal for the purpose of loosening the solids on the filter medium in a manner to be hereinafter described. A suitable conduit 35 is provided for conducting a supply of sluicing liquid to the respective filter devices being connected with conduits 21 of each of the devices. When arranged in battery form as shown in Figure 3, a single shaft 25 may be mounted to extend longitudinally of the battery and may be provided with a plurality of levers 24, one for each filter device. A suitable handle, as for instance 36, may be provided for operating shaft 25 to simultaneously raise ball valves 16 of all or any desired number of filter devices which comprise the battery. Furthermore, if desired, master valves for simultaneously controlling the headers and conduits for all the devices of a battery may be provided.

By arranging the parts in the manner hereinbefore described, a filter is provided wherein the required content of liquor to be filtered may, if desired, be very low. The annular space 14 may be made very small, if desired, and this is of particular advantage in the treatment of slowly-filtering materials, where the time element is of great importance. By making the annular space 14 of comparatively low volume, the content of valuable liquor contained in the device when the medium becomes loaded is a minimum, and accordingly the washing time is minimized, and it is unnecessary to take special precaution in order to save the content of valuable liquor.

In the operation of the filter device hereinbefore described it will be understood that the filter medium may be, preliminarily to operation, provided with the usual precoat. This may be accomplished by the circulation of a liquid, preferably previously clarified liquor to which has been added a desirable amount of filter aid. This mixture may be circulated and recirculated through the filter device until the desired precoat is deposited upon the filter medium. The supply of slurry or pulp to be filtered may then be introduced through feed supply header 28 and the feed conduits 18 of the respective filter devices. It will be understood that sufficient of the mixture to be filtered is introduced into the filter device to completely fill the annular space 14 which exists between the exterior of screen 1 and the interior of the case 7. In accordance with the usual practice pressure may be applied to the substance undergoing filtration. The clarified liquor or filtrate will emerge on the interior of filter medium 1 in the annular space 5 and from there be withdrawn through conduits 19 and 20 and conducted to conduit 31 for storage or other disposal. The arrangement shown in the drawings is particularly advantageous, especially since by virtue of the fact that the active area of the filter medium is completely submerged in the substance undergoing filtration before any filtrate is removed, the tendency is for an even and uniform distribution of solids over the filter medium, which also facilitates the cleansing operations and increases the efficiency of the device.

When the filter device has been in operation for a time sufficient to cause the filter medium to become loaded, the supply of feed liquor or pulp thereto may be discontinued by the operation of a suitable valve. The usual washing operation may then be accomplished in order to remove from the solids collected on the filter medium the liquor entrained therein. This may be accomplished by introducing through the feed supply line a supply of washing water, and this, it will be understood, will be forced through the filter until the valuable liquors are recovered from the load of solids, whereupon the supply of washing water may be discontinued and the cleansing operation begun. At this time valve 32 may be closed in order to block the connection between conduit 20 and the filtrate conduit 31. Valve 33 may then be opened to connect the interior of the filter medium to the annular space 5 with a source of pressure supply, and, if desired, a suitable amount of fluid, such for instance as water, steam or air under pressure, may be introduced through conduit 20 from conduit 34. This pressure, it will be understood, is in the opposite direction to the normal filtering pressure and tends to loosen the solids which are collected on the exterior of the filter medium. It will be understood that this operation in the embodiment shown in Figs. 3 and 4 occurs simultaneously with all the filter devices of the battery, but by provision of suitable valves any one or more of the devices may be individually controlled.

Either concurrently with or prior to the introduction of the pressure fluid through conduit 20 an attendant may throw handle 36 in a counter-clockwise direction, as seen in Fig. 4, thereby actuating the various levers 24 and raising ball valve 16 in each of the filter devices from its seat. As pointed out above, the orifice 15 is of such size as to permit the contents of the filter device to fall or drop out substantially rapidly. This has the tendency of further loosening the collected solids on the exterior of the filter medium. In accordance with the present invention after the ball valve 16 has been raised to permit the contents of the filter to be quickly discharged, a supply of sluicing liquid, for instance water preferably under pressure, is introduced into dome 8 through conduit 21. The accumulated water under pressure in dome 8 is then discharged through the clearance spaces 23 which, it will be understood, extend entirely around the filter medium 1 and thereby form, in effect, annular nozzles being substantially the same shape as the external contour of the filter medium. The streams of sluicing liquid therefore issue from clearances 23 in the form of annular sheets, in the embodiment illustrated in Fig. 1, the direction of which is substantially parallel to the surface of filter medium 1 and the force of which is downward. The action of the sluicing liquid is such as to dislodge the collected solids from the exterior of the filter medium and the action may be characterized as one of stripping or peeling the collected solids therefrom. The downward flow of the sheets of sluicing liquor carries with it the solids which are dislodged from the filter medium 1, and this is emitted through the open quick discharge valve 16. After this sluicing operation has continued for a time sufficient to remove the collected solids from the filter medium, the quick discharge valve 16 may be closed and the sluicing liquor allowed to accumulate in the device and fill up the annular space 14. In this manner, it is readily possible to clean the filter supply line, and this may be accomplished at this time by opening a drain valve, which may be suitably positioned for instance on the supply conduit 28. After the draw-in valve 28 is opened, the water contained in the device which has accumulated since the closing of quick discharge valve 16 will be forced outwardly through the conduit 18 and supply header 28, by virtue of the pressure exerted on the interior of the filter—that is, by the introduction of steam, air, or water under pressure through the conduit 20. As the water contained in tank 7 discharges through the conduit 18, the level thereof will be gradually lowered in the tank and a progressively greater area of filter medium will be exposed above the level of the water. Consequently the fluid, for instance steam under pressure on the interior filter medium 1, is particularly effective to blow out the interstices of the filter medium directly above the surface of the water. Since the level of the surface of the water is being gradually lowered, it is apparent that the entire filter medium will be efficiently cleansed so as to prevent blinding thereof and prolong the life of the filter medium.

With the sluicing operation to remove the load of solids from the filter medium accomplished and the feed supply line cleaned, the device is now in condition for a repetition of the filtering cycle.

Referring now particularly to Figs. 6 and 7 a modified form of the invention is shown wherein the principles hereinbefore referred to are applied to a type known as the plate and frame filter. A suitable tank 50 is provided to receive a plurality of individual filter media and is preferably divided by a plurality of laterally extending partitions 51, each of which defines a separate filtering compartment. The material to be filtered may be introduced into the tank through the supply conduits 18 in the manner hereinbefore described. Mounted in each of the compartments defined by partitions 51 is a filter element 52 in the form of a filter plate. The interior of the respective filter plates 52 is suitably connected to a filtrate conduit, such as 53. Accordingly when the respective compartments become filled with the pulp or liquor to be filtered the pressure applied to the liquor or pulp is sufficient to cause the fluid constituents to pass through the filtering element 52 and be collected in conduit 53 as filtrate or clarified liquor.

In the embodiment illustrated in Figs. 6 and 7 a multiple header 54 is provided and a plurality of domes 55, each connected with a suitable source of sluicing liquid 56, are arranged therein. The header 54 is so arranged that the dome 55 may communicate with the corresponding compartments of tank 50 through narrow openings 57. The openings 57 extend adjacent the filter media of frame 52 and as will be apparent from Fig. 7 the shape of the opening 57 for each of the respective filter elements 52 is substantially the same as the external contour of the filter medium. In this manner when a supply of sluicing liquid is introduced into dome 55 it is apparent that a sheet-like stream thereof will be directed downwardly across substantially the entire area of the filter medium thereby producing the same stripping or peeling action as hereinbefore described and readily removing the collected solids therefrom.

It will be understood that the embodiment illustrated in Figs. 6 and 7 readily lends itself to the process of cleaning which was hereinbefore described in connection with the embodiment of Fig. 1 particularly since by the provision of suitable valves a reverse pressure may be applied through conduit 53 to loosen the collected solids upon the exterior of the filter medium. It is understood, of course, that the quick discharge valves, one of which may be provided for each individual compartment as shown or, if desired, a single quick discharge valve for all compartments, may be operated for suddenly releasing or dropping the contents from all the various compartments in the form of a gush as hereinbefore described with reference to the embodiment of Fig. 1; in the latter case, however, the partitions 51 may be eliminated.

From the foregoing description it is apparent that many modifications of the filter hereinbefore described will present themselves to those skilled in the art without departing from the spirit of this invention. It is to be distinctly understood, therefore, that this invention is not limited to the specific details hereinbefore set forth for the purposes of illustration, but that such modifications and use of such individual features and sub-combinations of features, as do not depart from the spirit of this invention are, although not specifically described herein, contemplated by and within the scope of the appended claims.

Having thus described the invention what is claimed is:

1. A self-sluicing filter comprising, in combination, a cylindrical casing, a cylindrical filter medium within and coaxial of the casing, feeding means below the medium and communicating with the exterior thereof, filtrate discharge means above and communicating with the interior of said medium and a member including a sluicing port extending substantially around and inside a head of the casing, and along one margin of the filter medium.

2. In the art of filtering, the method of cleaning hollow filter media comprising, submerging the medium, applying fluid pressure internally of the medium and concurrently removing the submerging liquor from the region of the medium, and projecting a sheet of cleansing fluid, along the surface of the filter medium.

3. In a filter cell, a tubular casing, a tubiform filter medium, disposed within and spaced from the inner wall of the casing, to constitute a substantially annular chamber, means for introducing a solid-bearing fluid to said chamber, and a sluicing head disposed at one end of said chamber and provided with a pair of spaced slots, said slots being substantially coextensive, respectively with margins of the casing wall and of the filter medium, and means for supplying fluid to the sluicing head for projection through said slots.

4. In a structure constituting a filter cell, a tubular housing or casing, a tubular filter element or medium arranged coaxially within the casing and spaced from the casing wall to constitute a substantially annular compartment, a removable head closure at one end of the casing and a substantially annular element mounted at one end of said compartment and within the casing, said annular element being formed and positioned in the casing to provide an orifice for the projection of a fluid into said compartment, the annular member being arranged for removal from the casing with said head, to facilitate the removal from the casing, of said filtering element.

WALTER J. LIBBEY.
L'ROCHE GEORGE BOUSQUET.